Oct. 6, 1953 L. M. FRANCIS 2,654,615
TANDEM WHEEL AND SPRING SUSPENSION
Filed Oct. 22, 1949 4 Sheets-Sheet 1
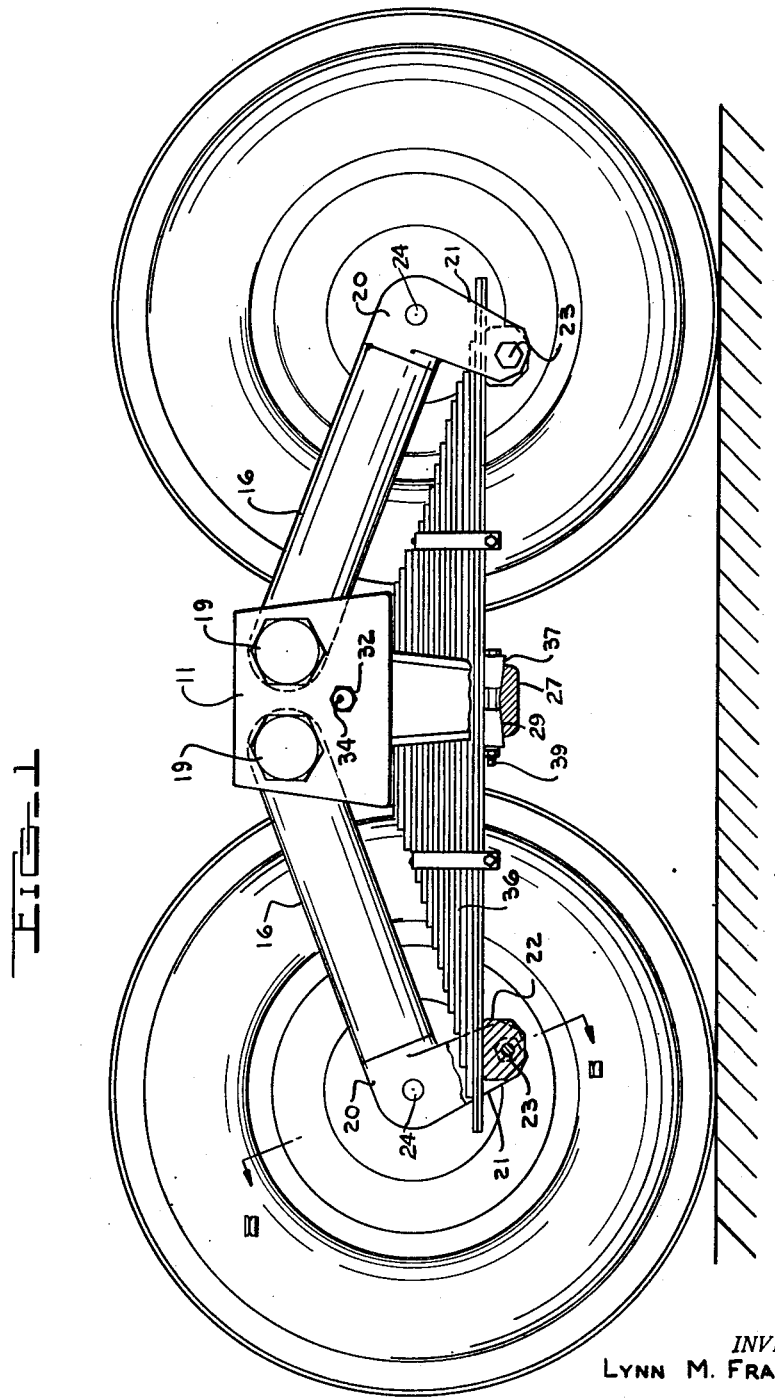
INVENTOR.
LYNN M. FRANCIS
BY
ATTORNEY Oct. 6, 1953  L. M. FRANCIS  2,654,615
TANDEM WHEEL AND SPRING SUSPENSION
Filed Oct. 22, 1949  4 Sheets-Sheet 2
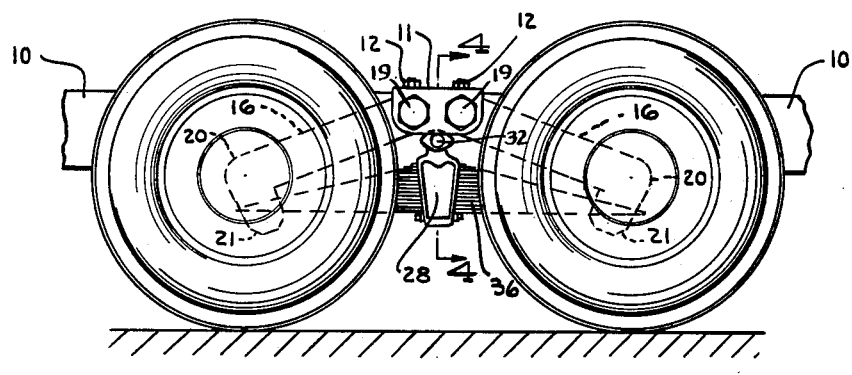
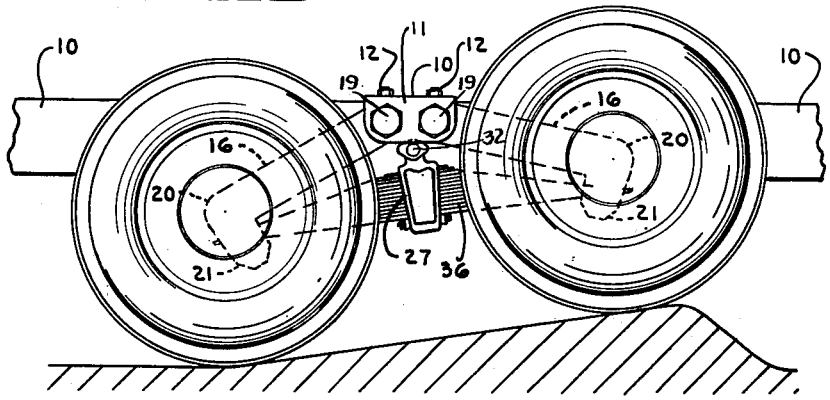
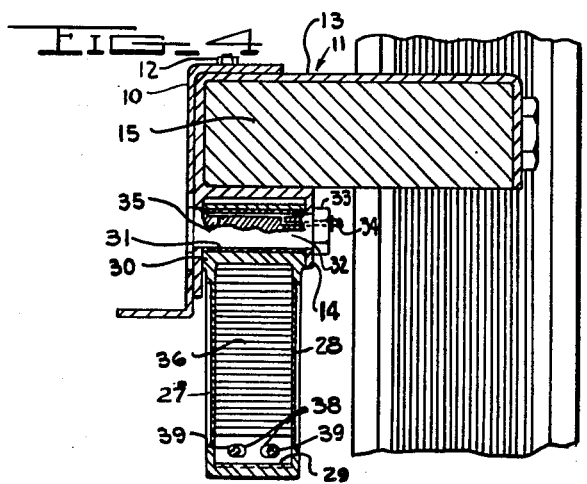
*INVENTOR.*
LYNN M. FRANCIS
BY
*ATTORNEY*

Oct. 6, 1953
L. M. FRANCIS
2,654,615
TANDEM WHEEL AND SPRING SUSPENSION
Filed Oct. 22, 1949
4 Sheets-Sheet 3
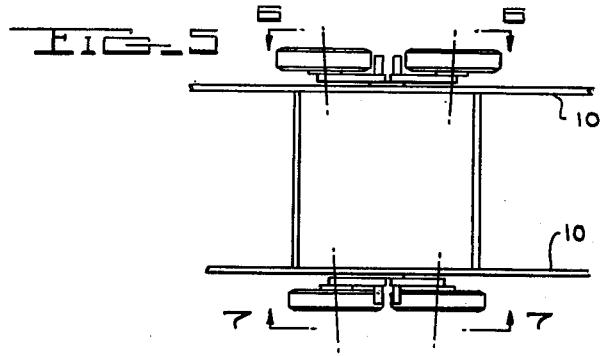
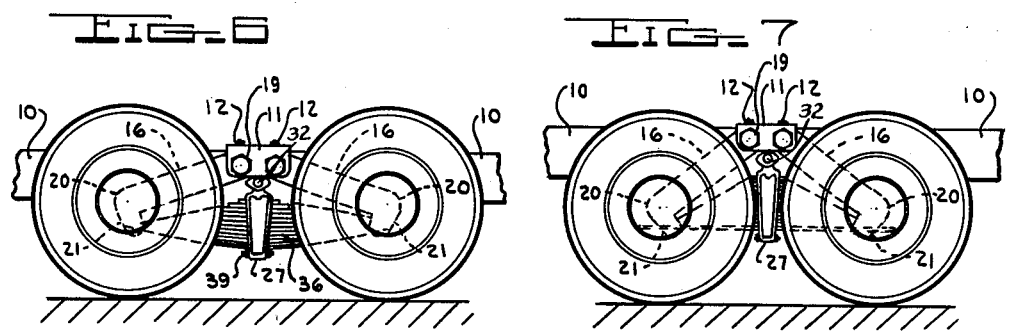
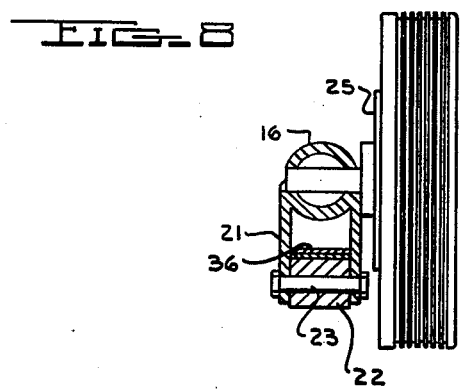
INVENTOR.
LYNN M. FRANCIS
BY
*Arthur M. Smith*
ATTORNEY

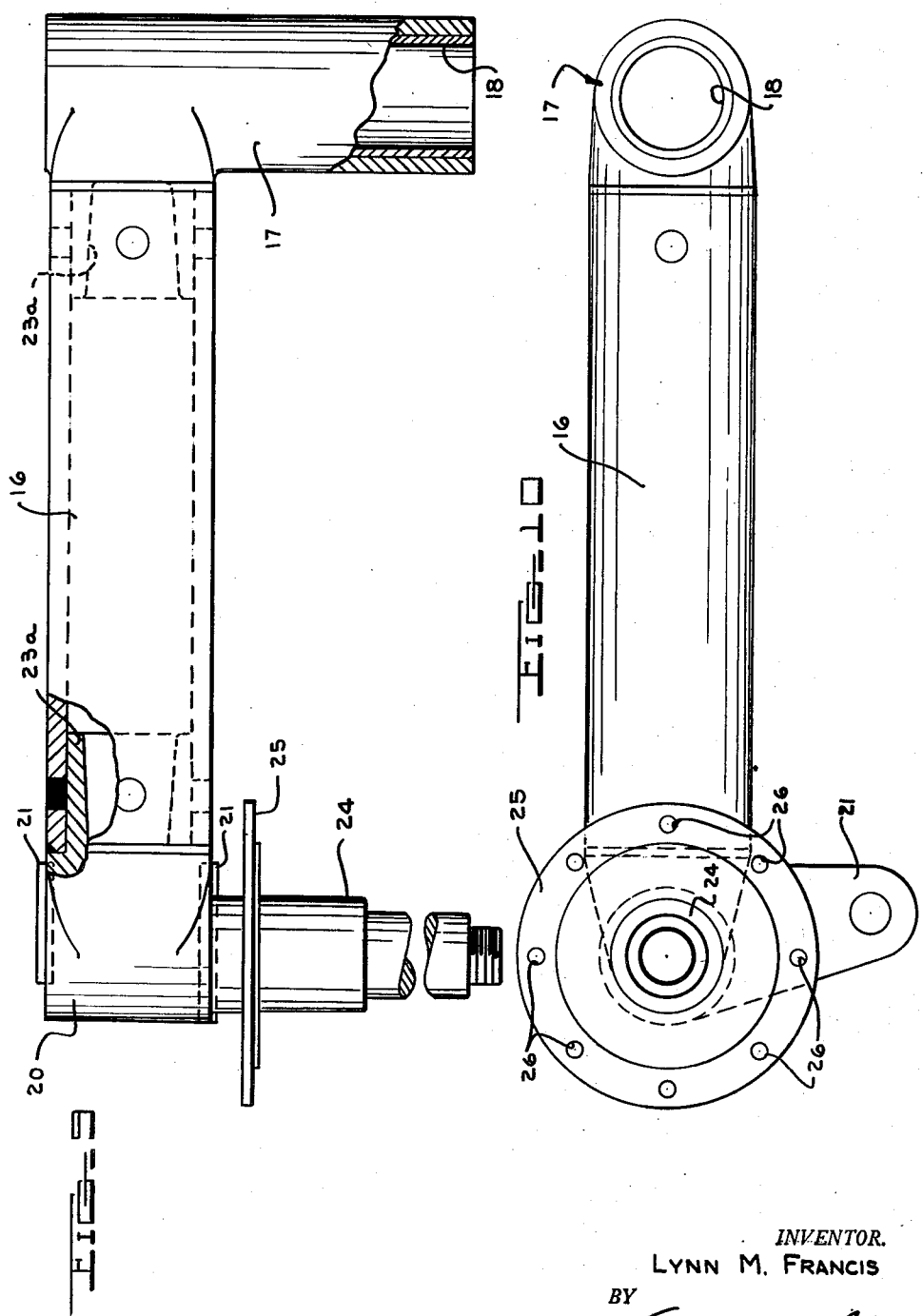

Patented Oct. 6, 1953

2,654,615

UNITED STATES PATENT OFFICE 2,654,615

TANDEM WHEEL AND SPRING SUSPENSION

Lynn M. Francis, Detroit, Mich.

Application October 22, 1949, Serial No. 123,008

3 Claims. (Cl. 280—104.5)

The present invention relates to a tandem wheel and spring suspension and is particularly but not exclusively adapted for use with trailer constructions.

Single and dual wheel suspensions and tandem wheel constructions which have been used prior to the present invention have been found to be objectionable or unsatisfactory for several reasons. The following four objections have posed serious problems which applicant has solved by the construction of the present invention:

1. *Tire scuffing.*—Excessive wear and scuffing of tires has been characteristic of conventional vehicle tandem wheel suspensions. This is due to the different radius of turning of the inner and outer wheels when traveling around a curve, and the shifting of the weight of the vehicle and its load.

Theoretically, the ideal solution to this problem would be to provide a wheel suspension involving two particular features, namely, a movable axis between each pair of wheels which are disposed directly opposite each other on opposite sides of the trailer, which axis could change automatically to become substantially perpendicular to the arc of the curve around which it is traveling; and a wheel connection at each wheel which would allow the wheel to track the curve.

It would be highly impractical, if not impossible, to dispose each wheel of a trailer wheel suspension on its respective axle in such a manner as to allow the wheel to track a curve. However, applicant has been able to reduce the scuffing of tires to a minimum in a construction wherein the movable axis principle alone has been used.

2. *Irregular floors and high floors.*—Wheel suspensions which have been used previously with trailer frames have generally involved an axle extending laterally across the entire width of the trailer frame. These full length axles have necessitated constructing a level floor above the height of the axle, or providing a low floor which rises over the axles and then drops to a low level.

Applicant has provided a vehicle wheel suspension embodying stub axles which do not extend across the trailer body, thus permitting the use of a low even floor which maintains a low center of gravity when the vehicle is loaded, and eliminates the necessity of raising the floor over the axle and then dropping it.

3. *Wheel shock.*—The loads which trailers have been able to carry have been determined in part by the tires used with the trailer. The shock created by irregularities in the roads must be considered in figuring loads which conventional tires will properly carry. In most wheel suspensions there is a large amount of unsprung weight which adds to the shock encountered by the wheels and tires. In some tandem constructions there is as much as two thousand pounds unsprung weight which results in enormous wheel shock.

Applicant has provided a wheel suspension wherein there is a very small amount of unsprung weight, thus minimizing wheel shock and permitting heavier loads to be carried with conventional tires.

4. *Unequal load distribution among tandem wheels.*—In conventional tandem wheel suspensions wherein the wheel axes are not allowed to move relative to each other it has been found that when one wheel encounters an obstruction, it must bear the full load and shock while the other wheel is free of load. This results in great tire shock and strain. In applicant's construction, each of the wheels bears an equal load due to the fact that the spring is pivotally movable and thus both wheels remain in contact with the road when an obstruction is encountered.

In addition, when one wheel raises a certain distance, the trailer frame raises only one-half that distance since the other wheel remains in contact with the road. Thus, there is a minimum of vertical movement of the trailer body over rough or irregular roads.

Accordingly, it is an object of the present invention to provide a tandem wheel and spring construction for vehicles, which construction will reduce the scuffing and wear of tires which results from dragging the wheels when the vehicle travels around a curve.

It is another object of the present invention to provide a tandem wheel and spring suspension which employs stub axle shafts and eliminates full length axles, thus permitting the use of a low even floor.

It is another object of the present invention to provide a tandem wheel and spring suspension wherein loads are equally distributed among the wheels and wherein each wheel is mounted on a stub shaft, the stub shafts being independently pivotally movable relative to each other about different axes so that the wheels disposed thereon may move independently in a vertical or horizontal direction.

It is another object of the present invention to provide a simple wheel and spring suspension which may be detachably secured to a vehicle frame quickly and easily, thus simplifying repair and replacement.

It is another object of the present invention to provide a tandem wheel and spring suspension comprising a pair of wheels each rotatably disposed on a link arm, the link arms being pivotally attached to a fastening member, and a spring in slidable engagement with the free ends of the link arms and pivotally attached intermediate its ends to the said fastening member, the link arms thus being capable of independent or simultaneous pivotal movement and the spring being adapted to distribute the load equally to both wheels when they are horizontally misaligned.

It is a further object of the present invention to provide a tandem wheel and spring suspension wherein there is a minimum amount of unsprung weight, thus reducing tire and wheel shock.

Other objects of this invention will appear in the following description and appended claims, reference being had to the accompanying drawings forming a part of this specification wherein like reference characters designate corresponding parts in the several views.

In the drawings:

Fig. 1 is an inside elevation of a tandem wheel and spring suspension embodying the present invention.

Fig. 2 is an outside elevation of the device shown in Fig. 1 attached to a vehicle frame.

Fig. 3 is an outside elevation of the device shown in Fig. 1 with the various parts in their respective positions when one wheel encounters an obstruction.

Fig. 4 is a sectional view taken along the line 4—4 in the direction of the arrows, Fig. 2.

Fig. 5 is a plan view of a vehicle frame embodying the tandem wheel and spring suspension of the present invention, showing the relationship of the inside and outside wheels in a turning position.

Fig. 6 is a side elevation taken along the line 6—6 in the direction of the arrows, Fig. 5.

Fig. 7 is a side elevation taken along the line 7—7 in the direction of the arrows, Fig. 5.

Fig. 8 is a sectional view taken along the line 8—8 in the direction of the arrows, Fig. 1.

Fig. 9 is a top view of one of the link arms of the wheel and spring suspension of the present invention.

Fig. 10 is a side elevation of the link arm shown in Fig. 9.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the numeral 10 designates a portion of a trailer frame. A fastening member 11 is attached to the frame portion 10 by the nut and bolt assemblies 12. In Fig. 4 it will be seen that the fastening member 11 includes the large inverted U-shaped housing 13 and a small inverted U-shaped housing 14. The large housing 13 is provided with a lateral reinforcing rib 15.

Two hollow tubular link arms 16 extend one from each of the open end portions of the housing 13. Referring to Figs. 9 and 10, it will be seen that the upper end of each link arm 16 is provided with a cylindrical trunnion member 17 having a bushing 18 disposed therein. Shafts 19 extend through the housing 13 and the bushings 18 to provide a pivotal connection between the housing 13 and the link arms 16. The other end of each link arm 16 is provided with an end cap 20 which is rigidly secured thereto. The end cap 20 is provided with a downwardly extending supporting arm 21 on each side thereof. A bearing block 22 (Fig. 1) is disposed between the lower ends of the supporting arms 21 and is pivotally held in place by a pin 23.

The trunnion member 17 and end cap 20 are provided with sleeves 23a which fit into the tubular link arms 16. The members 17 and 20 are welded into place as indicated in Fig. 9.

Extending outwardly from the end cap 20 is a stub shaft 24 having a brake drum mounting plate 25 rigidly mounted thereon. The brake drum mounting plate is provided with the spaced holes 26 (Fig. 10) to permit attachment of a brake drum and wheel assembly.

A spring retaining member is indicated by the number 27. The sides of the spring retaining member 27 are provided with the indentures 28 to reduce the weight thereof. The end portions of the spring retaining member 27 are open. The inner face 29 of the bottom of the spring retaining member 27 is tapered from the middle to the open end portions so that the highest point of the face is in the middle. The upper portion of the spring retaining member 27 is provided with the hub 30 which is pivotally seated within the housing 14 and is provided with a bearing 31 journaled on the pin 32. The end of the pin 32 is screw-threaded to accommodate a nut 33 which secures the pin 32 in position. A grease fitting 34 is located on the end of the pin 32 and communicates with the lubricating passage 35 therein to permit lubrication of the pivotal connection.

A leaf spring 36 is disposed within the spring retaining member 27 and is seated near each end in sliding engagement on the bearing blocks 22. A pair of wedge members 37, tapered on the bottom and flat on the top are inserted between the main leaf of the spring 36 and the tapered bottom face portion 29 of the spring retaining member 27.

Enlarged holes 38 extend longitudinally through the wedge members 37 to accommodate the bolts 39 extending therethrough. The enlarged holes 38 permit a punch to be inserted through one wedge in order to knock out the other wedge when removing the spring 36 from the assembly.

When a trailer embodying the device of the present invention travels around a curve, the outside wheels will move to the position shown in Fig. 6 and the top of Fig. 5, and the inside wheels will move to the position shown in Fig. 7 and the bottom of Fig. 5.

To demonstrate the action of the suspension of the present invention, the outer wheel and spring suspension acts in the following manner when traveling around a curve:

The weight and load of the trailer will tend to shift to the outside of the turn. This shifting of weight will cause the frame portion 10 adjacent the mountings to move downward and consequently, the link arms 16 will rotate about their axes 19. The spring 36 will be loaded since the fastening member 11 is moving downward with the frame. The ends of the spring 36 are prevented from moving downward by the supporting arms 21 and bearing blocks 22. Since the bearing blocks 22 are moving further apart with the link arms 16, the said bearing blocks 22 slide along the bottom leaf of the spring 36. The bearing blocks 22 are pivotally disposed between the supporting arms 21 and thus accommodate flexing of the spring 36.

Imaginary axes extending between the two forward wheels and the two rearward wheels of a pair of oppositely disposed wheel suspension units are represented by dotted lines in Fig. 5. It will be noted that these axes are moved out of the normal position to a position which is substantially perpendicular to the arc of the curve or turn.

Fig. 3 reveals the relative positions of the various parts of the suspension of the present invention when an obstruction is encountered. The link arm 16 furthest to the right pivots about its pin 19 and permits the attached wheel to move upward. The spring assembly pivots about the pin 32. As the right link 16 pivots upward, the right bearing block 22 slides along the main leaf of the spring 36.

From the foregoing description, it will be seen that I have provided a tandem wheel and spring suspension which reduces tire scuffing due to the fact that the wheel axes of each suspension unit may move relative to each other in a horizontal plane transverse to the said axes. Thus, an imaginary axis which extends through the centers of each pair of oppositely disposed wheels will automatically change to become substantially perpendicular to the arc of a curve around which it is traveling.

The wheel and spring suspension of the present invention permits use of a vehicle or trailer having an even floor close to the road level due to the use of stub axles which do not extend across the frame. In vehicles such as automobile carrying trailers this affords a low center of gravity to stabilize the trailer, and eliminates the necessity of loading the automobiles on the lower deck over a rise in the rear section of the trailer. Further, the necessity of positioning the first and last cars at an angle along raised portions of the floor over the axles is eliminated.

The present device minimizes the amount of unsprung weight in a wheel and spring suspension. The trailer frame is spring supported, and the suspension unit is spring supported with the exception of a small part of the weight of each link arm 16 which is supported by the pin 19. Accordingly, when an obstruction is encountered the greatest portion of the shock is absorbed by the spring, thus greatly reducing wheel and tire shock.

The particular tandem construction of the present invention also assures an equal load distribution among the wheels due to the pivotal spring construction and the pivotal link arm construction which resiliently maintain both wheels in contact with the road when an obstruction is encountered.

Another important advantage of applicant's construction is the increased efficiency of the brakes which accompanies the construction. When the brakes are applied, the tandem wheels of each suspension tend to spread apart. This causes the weight of the vehicle to move downward toward the road and creates an additional braking effect. The center of gravity is lowered and the tendency for the vehicle to raise when the brakes are applied is minimized.

Having thus described a new and useful wheel and spring suspension which has proved commercially valuable under test conditions, I claim:

1. A tandem wheel and spring suspension comprising a fastening member adapted for detachable connection to a vehicle frame, a pair of link arms each pivotally connected at one end to said fastening member, an end cap rigidly affixed to the other end of each of said link arms, a pair of downwardly extending supporting arms disposed one on each side of each of said end caps, a bearing block pivotally connected between each pair of said supporting arms, an outwardly extending stub shaft disposed on each of said end caps and having a brake drum mounting plate thereon, a spring retaining member pivotally connected at its top to said fastening member and having a tapered face on its inner bottom portion, a leaf spring connected at its center portion to said spring retaining member, and wedge means adjustably disposed between the bottom of said spring and the tapered face of the said spring retaining member, the ends of said spring being disposed in sliding engagement upon said bearing blocks.

2. A tandem wheel and spring suspension adapted for connection to a vehicle frame, including a fastening member comprising an upper inverted U-shaped housing and a lower inverted U-shaped housing having open end portions, a pair of link arms each having its upper end enclosed in said upper U-shaped housing in pivotal engagement therewith and each extending in a different direction from one of the open end portions thereof, a wheel assembly mounting member extending outwardly from the lower ends of each of said link arms, regulating means suspended below the lower end of each of said link arms to permit relative movement of a spring and the lower end of said link arm, a spring retaining member having its top portion enclosed in said lower inverted U-shaped housing in pivotal engagement therewith, and a leaf spring extending through said spring retaining member and having its ends engaging said regulating means, wherein the said link arms may pivot together or separately about their axes and the said spring retaining member will pivot to accommodate pivotal movement of the said link arms, the relative movement of the lower ends of each link arm and the end of the spring adjacent thereto being accommodated by the said regulating means.

3. In a tandem wheel and spring suspension, a fastening member adapted for connection to a vehicle frame and including an upper inverted U-shaped housing and a lower inverted U-shaped housing below said upper housing and extending in the same direction, said lower housing being smaller than said upper housing, a pair of link arms each having an upper end and a lower end, said link arms being pivotally seated at their upper ends within said upper housing, a pair of wheel supporting members one connected to the lower end of each of said link arms, a pair of regulating members one affixed to each of said wheel supporting members, a leaf spring slidingly engaged near its ends with the regulating members and a spring retaining member affixed to the central portion of said spring and having its upper end pivotally seated in the lower housing of said fastening member.

LYNN M. FRANCIS.

References Cited in the file of this patent

UNITED STATES PATENTS

| Number | Name | Date |
| --- | --- | --- |
| 1,913,698 | Clement | June 13, 1933 |
| 2,117,577 | Simning | May 17, 1938 |
| 2,172,173 | Peterman | Sept. 5, 1939 |
| 2,400,199 | Harbers | May 14, 1946 |
| 2,451,293 | Long | Oct. 12, 1948 |
| 2,465,181 | Williams et al. | Mar. 22, 1949 |

FOREIGN PATENTS

| Number | Country | Date |
| --- | --- | --- |
| 385,758 | Great Britain | Jan. 5, 1933 |
| 729,859 | France | Aug. 2, 1932 |